United States Patent
Koo et al.

(10) Patent No.: US 10,140,258 B2
(45) Date of Patent: Nov. 27, 2018

(54) PORTABLE DEVICE AND IMAGE DISPLAYING METHOD THEREOF

(71) Applicant: Samsung Electronics Co., Ltd., Suwon-si, Gyeonggi-do (KR)

(72) Inventors: Min-soo Koo, Seoul (KR); Seung-seop Park, Seoul (KR); Sung-hyun Cho, Seoul (KR); Kyung-hoon Han, Seoul (KR); Chae-Kyung Lee, Seoul (KR); Jung-ah Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 545 days.

(21) Appl. No.: 14/050,899

(22) Filed: Oct. 10, 2013

(65) Prior Publication Data
US 2014/0101524 A1    Apr. 10, 2014

(30) Foreign Application Priority Data
Oct. 10, 2012    (KR) .......................... 10-2012-0112650

(51) Int. Cl.
*G06F 17/00*    (2006.01)
*G06F 17/21*    (2006.01)
*G09G 5/14*    (2006.01)

(52) U.S. Cl.
CPC .......... *G06F 17/212* (2013.01); *G06F 17/211* (2013.01); *G09G 5/14* (2013.01); *G09G 2340/0407* (2013.01); *G09G 2340/0442* (2013.01); *G09G 2340/0464* (2013.01); *G09G 2370/027* (2013.01)

(58) Field of Classification Search
CPC ................. G06F 17/212; G06F 17/211; G09G 2340/0464; G09G 2370/027
See application file for complete search history.

(56) References Cited

U.S. PATENT DOCUMENTS

| | | | |
|---|---|---|---|
| 5,642,473 A * | 6/1997 | Klotz, Jr. ................ | G06T 11/60 358/1.18 |
| 6,915,484 B1 | 7/2005 | Ayers et al. | |
| 7,184,167 B1 | 2/2007 | Ito et al. | |
| 8,042,042 B2 * | 10/2011 | Kim .................... | G06F 3/04883 345/173 |
| 8,064,962 B2 | 11/2011 | Wilcox et al. | |
| 8,145,995 B2 | 3/2012 | Rohrabaugh et al. | |
| 8,209,635 B2 | 6/2012 | Thom | |
| 2003/0014445 A1 * | 1/2003 | Formanek ............. | G06F 17/211 715/247 |
| 2004/0145593 A1 * | 7/2004 | Berkner ................. | G06T 11/60 345/619 |
| 2005/0041044 A1 | 2/2005 | Gannon | |

(Continued)

*Primary Examiner* — Scott T Baderman
*Assistant Examiner* — Matthew G McVicker
(74) *Attorney, Agent, or Firm* — Jefferson IP Law, LLP

(57) ABSTRACT

A portable device and an image displaying method thereof are provided. An method of displaying images in a portable device includes displaying a plurality of text blocks and at least one multimedia block when the portable device is in a first display mode, and arranging and displaying the plurality of text blocks and the at least one multimedia block in a second display mode, wherein the arrangement is determined based on distances between the plurality of text blocks and the at least one multimedia block as displayed in the first display mode.

11 Claims, 12 Drawing Sheets

(56) References Cited

U.S. PATENT DOCUMENTS

| | | | |
|---|---|---|---|
| 2005/0188303 A1* | 8/2005 | Ayers | G06F 17/212 715/244 |
| 2007/0208996 A1* | 9/2007 | Berkner | G06F 17/212 715/210 |
| 2009/0119580 A1* | 5/2009 | Rohrabaugh | G06F 9/4443 715/249 |
| 2010/0066763 A1* | 3/2010 | MacDougall | G06F 1/1626 345/656 |
| 2010/0174985 A1* | 7/2010 | Levy | G06F 17/211 715/244 |
| 2011/0179350 A1* | 7/2011 | Capela | G06F 17/211 715/244 |
| 2012/0246594 A1 | 9/2012 | Han et al. | |
| 2012/0311438 A1* | 12/2012 | Cranfill | G06F 17/30011 715/256 |
| 2013/0275854 A1* | 10/2013 | Lim | G06F 17/2705 715/234 |
| 2013/0283148 A1* | 10/2013 | Lim | G06F 17/30896 715/234 |
| 2013/0321867 A1* | 12/2013 | Dejean | G06F 17/211 358/1.16 |

* cited by examiner

PORTABLE DEVICE AND IMAGE DISPLAYING METHOD THEREOF

CROSS-REFERENCE TO RELATED APPLICATION(S)

This application claims the benefit under 35 U.S.C. § 119(a) of a Korean patent application filed on Oct. 10, 2012 in the Korean Intellectual Property Office and assigned Serial No. 10-2012-0112650, the entire disclosure of which is hereby incorporated by reference.

TECHNICAL FIELD

The present disclosure relates to a portable device and an image displaying method thereof. More particularly, the present disclosure relates to a portable device capable of displaying document data including text blocks and multimedia blocks, and an image displaying method thereof.

BACKGROUND

An electronic book (e-book) includes content that may comply with a specification based on Electronic Publication (EPUB) and focuses on digitalization of contents expressed on paper book.

Currently, as EPUB 3 specification adopts HyperText Markup Language (HTML) 5, multimedia elements which are distinct from paper books can be applied to e-book contents. Accordingly, document data such as current e-book contents may include multimedia blocks to provide the user with diverse multimedia (e.g. images, videos, and widgets) as well as text information.

General HTML document data may be written on the basis of a predetermined screen. Accordingly, when the size of screen changes, the components of the document data cannot be expressed properly. For example, if document data is written in horizontal mode of a portable device, when the display mode of the portable device changes from horizontal mode to vertical mode, the portable device may not display a portion of text blocks and multimedia blocks or may change the size of text blocks and display them.

Accordingly, the user may not properly see the document data when the portable device operates in a predetermined display mode.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is not required to overcome the disadvantages described above, and an embodiment of the present disclosure may not overcome any of the problems described above.

The present disclosure provides a portable device capable of determining arrangement order of a plurality of text blocks and at least one multimedia block and arranging and displaying the plurality of text blocks and the at least one multimedia block when display mode of the portable device has changed, and an image displaying method thereof.

In accordance with an aspect of the present disclosure, a method of displaying images in a portable device is provided. The method includes displaying a plurality of text blocks and at least one multimedia block in a first display mode, and arranging and displaying the plurality of text blocks and the at least one multimedia block in a second display mode, wherein the arrangement is determined based on distances between the plurality of text blocks and the at least one multimedia block as displayed in the first display mode.

The arranging of the text blocks and the at least one multimedia block may include determining an order of the plurality of text blocks, determining a text block closest to each of the at least one multimedia block, and arranging the at least one multimedia block based on the plurality of text blocks and after the text block closest to the at least one multimedia block.

The text block closest to the multimedia block may be determined by calculating distances between central points of the at least one multimedia block and central points of the plurality of text blocks.

The order of the plurality of text blocks may be predetermined.

The arranging of the plurality of text blocks and the at least one multimedia block further may include arranging a first multimedia block of the at least one multimedia block after a first text block closest to the first multimedia block.

The arranging of the at least one multimedia block may include determining an order of the plurality of text blocks, calculating at least one vector by connecting central points of the plurality of text blocks in sequence based on the order of the plurality of text blocks, and arranging the plurality of text blocks and the at least one multimedia block in a display order based on a distance between the at least one vector and the central points of the plurality of text blocks and the at least one multimedia block.

The first display mode may be one of a horizontal mode and a vertical mode, and the second display mode may be a mode which is different from the first display mode.

The at least one multimedia block may include at least one of an image block, a video block, a widget block, and a slide block.

In accordance with another aspect of the present disclosure, a portable device for displaying images is provided. The portable device includes a display configured to display an image in one of a first display mode and a second display mode, and a controller configured to control the display to display a plurality of text blocks and at least one multimedia block in the first display mode and to arrange and display the plurality of text blocks and the at least one multimedia block in the second display mode, wherein the arrangement is determined based on distances between the plurality of text blocks and the at least one multimedia block as displayed in the first display mode.

The controller may determine an arrangement order by determining an order of the plurality of text blocks, determining a text block closest to each of the at least one multimedia block, arranging the at least one multimedia block based on the plurality of text blocks, and arranging the multimedia block closest to the corresponding text block.

The controller may determine the text block closest to a multimedia block of the at least one multimedia block by calculating distances between a central point of the multimedia block and central points of the plurality of text blocks.

The controller may control the display to arrange the at least one multimedia block after a first text block closest to the first multimedia block.

The controller may determine an order of the plurality of text blocks, calculates at least one vector by connecting central points of the plurality of text blocks in sequence based on the order of the plurality of text blocks, and determine a display order using distances between the at least one vector and the central points of the plurality of text blocks and the at least one multimedia block.

The first display mode may have a screen of predetermined size and predetermined resolution, and the second display mode may have a screen of predetermined size and predetermined resolution which is different from that of the first display mode.

In accordance with another aspect of the present disclosure, an image displaying method of a portable device is provided. The image displaying method includes first display operation of displaying a plurality of text blocks and at least one multimedia block when the portable device is in a first display mode, and second display operation of arranging and displaying the at least one multimedia block after a text block which closest to the at least one multimedia block from among the plurality of text blocks when display mode of the portable device changes from the first display mode to a second display mode.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
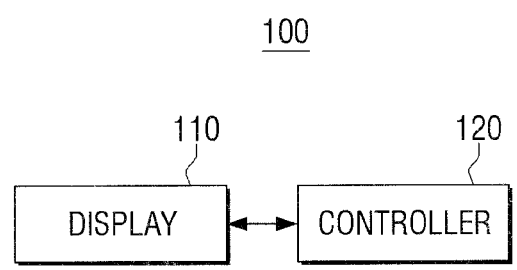
FIG. 1 is a block diagram of a portable device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

Various embodiments of the present disclosure will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the disclosure. Thus, it is apparent that the various embodiments of the present disclosure can be carried out without those specifically defined matters. Also, well-known functions or constructions are not described in detail since they would obscure the disclosure with unnecessary detail.

FIG. 1 is a block diagram of a portable device according to an embodiment of the present disclosure.

Referring to FIG. 1, a portable device 100 may include a display 110 and a controller 120. The display 110 displays image data according to control of the controller 120. In particular, the display 110 may display document data including a plurality of text blocks and at least one multimedia block. The multimedia block may include at least one of an image block, a video block, a widget block, and a slide block.

In addition, the display 110 may display image data in a first display mode or a second display mode. More specifically, when a sensor (not shown) senses that the portable device 100 is oriented in a horizontal direction, the display 110 may display image data in the horizontal mode, and when the sensor senses that the portable device 100 is oriented in a vertical direction, the display 110 may display image data in the vertical mode.

The controller 120 controls the overall operation of the portable device 100. In particular, the controller 120 may control the display 110 to display a plurality of text blocks and multimedia block in the first display mode, and to rearrange and display the plurality of text blocks and the multimedia block in the second display mode. The rearrangement may be determined based on the distances between the plurality of text blocks and the multimedia block in the first display mode.

More specifically, when the portable device 100 is in the first display mode, the controller 120 may display document data including a plurality of text blocks and the multimedia block. The first display mode of the portable device 100 provides an image on a screen which has the same horizontal and vertical lengths as a screen on which the document data are written. For example, when document data is written on a screen of 800*480, a screen of the first display mode may be 800*480.

In addition, when the display mode of the portable device 100 changes from the first display mode to the second display mode, the controller 120 may determine a rearrangement order of the plurality of text blocks and the multimedia block. The second display mode of the portable device 100 provides a screen having different horizontal and vertical lengths from the screen of the first display mode. For example, in the first display mode, the screen size may be 800*480, and in the second display mode, the screen size may be 480*800.

More specifically, the controller 120 determines the order of the plurality of text blocks. However, the order of the plurality of text blocks may be predetermined. Alternatively, the controller 120 may determine the order of the plurality of text blocks by paragraph analysis or semantic analysis of the text in the text blocks.

According to an embodiment of the present disclosure, when the order of the plurality of text blocks is determined, the controller 120 may determine which text block is closest in proximity to the multimedia block, for each multimedia block. For example, the controller 120 may calculate the distances between a central point of the multimedia block and central points of the plurality of text blocks, and determine that a text block having the shortest distance is the closest text block.

In addition, the controller 120 arranges the multimedia block based on the plurality of text blocks. That is, the controller 120 may arrange the multimedia block which is adjacent to a text block after rearrangement of the corresponding text block. For example, when it is determined that the order of first to third text blocks have first to third priorities respectively, and when it is determined that a first multimedia block is adjacent to the first text block, a second multimedia block is adjacent to the second text block, and a third multimedia block is adjacent to the third text block, the controller 120 may arrange the first to third text blocks first, and then arrange the first multimedia block subsequent to the first text block, the second multimedia block subsequent to the second text block, and the third multimedia block subsequent to the third text block. That is, the controller 120 may determine that the rearrangement order is the first text block, the first multimedia block, the second text block, the second multimedia block, the third text block, and the third multimedia block.

According to another embodiment of the present disclosure, the controller 120 may determine the order of the plurality of text blocks, calculate at least one vector by connecting the central points of the plurality of text blocks based on the order of the plurality of text blocks, determine a display order using the distances between the at least one vector and the central points of the plurality of text blocks and the at least one multimedia block, and determine that the display order becomes the rearrangement order. A more detailed description of an example will be given below with reference to FIGS. 3, 4, 5, 6, 7, 8, and 9.

In addition, the controller 120 may control the display 110 to rearrange and display the plurality of text blocks and the multimedia block in the determined rearrangement order as described above.

Using the portable device 100 as described above, the user can properly see the document data in any display mode.

Figure 2:
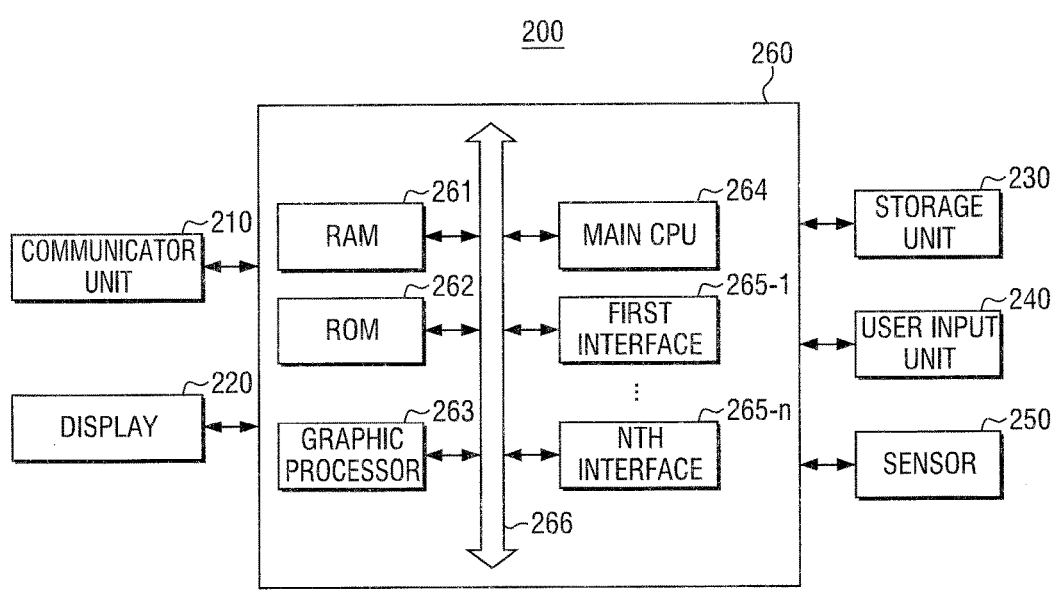
FIG. 2 is a detailed block diagram of a portable device according to an embodiment of the present disclosure.

FIG. 2 is a detailed block diagram of a portable device according to another embodiment of the present disclosure.

Referring to FIG. 2, the portable device 200 may include a communicator unit 210, a display 220, a storage unit 230, a user input unit 240, a sensor 250, and a controller 260.

The communicator unit 210 communicates with external devices or external servers according to different types of communication methods. In particular, the communicator unit 210 may include a wired communication module such as a Local Area Network (LAN) module, a wireless communication module such as a Wi-Fi chip, a Bluetooth chip, a Near Field Communication (NFC) chip, etc. The Wi-Fi chip, the Bluetooth® chip, and the NFC chip perform communication in Wi-Fi method, Bluetooth® method, and NFC method, respectively. The NFC chip is a chip that operates in the NFC method which uses a 13.56 MHz band from diverse Radio Frequency IDentification (RFID) frequency bands such as 135 kHz, 13.56 MHz, 433 MHz, 860-960 MHz, and 2.45 GHz. Using the Wi-Fi chip or the Bluetooth chip, connection information such as a SubSystem IDentification (SSID) and a session key are transmitted and received, and then communication is connected so that information can be transmitted and received. The wireless communication chip performs communication according to diverse communication standards such as standards associated with the Institute of Electrical and Electronic Engineers (IEEE), Zigbee®, $3^{rd}$ generation (3G), $3^{rd}$ Generation Partnership Project (3GPP), and Long Term Evolution (LTE).

The display 220 displays image data according to control of the controller 260. In particular, the display 220 may display document data including a plurality of text blocks and at least one multimedia block. The document data may be document data written in a HyperText Mark-up Language (HTML) format.

The multimedia block according to an embodiment may include at least one of an image block, a video block, a widget block, and a slide block. In addition, the multimedia block may be inserted into the document data in a floating method.

In addition, the display 220 may display image data in one of the first display mode and the second display mode. More specifically, when the sensor 250 senses that the display 220 is oriented in the horizontal direction, the display 220 may display image data in the horizontal mode, and when the sensor 250 senses that the display 220 is oriented in the vertical direction, the display 220 may display image data in the vertical mode.

The storage unit 230 stores modules to drive the portable device 200. For example, the storage unit 230 may store software including a base module, a sensing module, a communication module, a presentation module, a web browser module, and a service module. The base module is a basic module which processes a signal transmitted from hardware included in the portable device 200 and transmits the signal to an upper layer module. The sensing module is a module which collects information from sensors and analyzes and manages the collected information. The sensing module may include a face recognition module, a voice recognition module, a motion recognition module, a NFC recognition module, etc. The presentation module is a module which provides a display screen, and may include a multimedia module to play back and output multimedia content and a User Interface (UI) rendering module to perform processing of the UI. The communication module performs communication corresponding communication functions. The web browser module is a module which performs web browsing functions and accesses a web server. The service module is a module which includes applications to provide a variety of services.

In addition, the storage unit 230 stores other modules (e.g. an HTML processing module, etc.) to execute and display document data such as an electronic book (e-book).

The user input unit 240 receives a user command to control the overall operation of the portable device 200. The user input unit 240 may be implemented with an input device such as a mouse and a keyboard, but this is merely an embodiment. The user input unit 240 may be implemented with other input devices such as a touch panel, a pointing device, and a motion sensing device.

The sensor 250 senses the user's orientation of the portable device 200. For example, when sensing that the user holds the portable device 200 in horizontal direction, the sensor 250 transmits the sensing result to the controller 260, and when sensing that the user grips the portable device 200 in vertical direction, the sensor 250 transmits the sensing result to the controller 260. The sensor 250 may be implemented with a gyro sensor, but this is merely an embodiment. It is possible to sense the user's grip direction of the portable device 200 using other sensors.

The controller 260 controls the overall operation of the portable device 200 using different programs stored in the storage unit 230.

As shown in FIG. 2, the controller 260 may include a Random-Access Memory (RAM) 261, a Read-Only Memory (ROM) 262, a graphic processor 263, a main Central Processing Unit (CPU) 264, first to N$^{th}$ interfaces 265-1 to 265-N, and a bus 266. The RAM 261, the ROM 262, the graphic processor 263, the main CPU 264, and the first to N$^{th}$ interfaces 265-1 to 265-N may be connected to one another via the bus 266.

The ROM 262 stores a set of commands for booting up the system. When a turn-on command is input and the power is supplied, the main CPU 264 copies an Operating System (OS) stored in the storage unit 230 into the RAM 261 and executes the OS according to the commands stored in the ROM 262 so that the system can boot up. When the boot-up is complete, the main CPU 264 copies application programs stored in the storage unit 230 to the RAM 261 and executes the copied application programs so that operations can be performed.

The graphic processor 263 generates a screen including various objects, such as an icon, an image, and text, using an operator (not shown) and a renderer (not shown). The operator operates property values of each object, such as a coordinate value, shape, size and color, according to layout of the screen using a control command received from the user input unit 240. The renderer generates a screen layout including the objects based on the property values operated by the operator. The screen generated by the renderer is displayed on a display area of the display 220.

The main CPU 264 accesses the storage unit 230 and boots up the system using the OS stored in the storage unit 230. In addition, the main CPU 264 performs various operations using various programs, content, and data which are stored in the storage unit 230.

The first to N$^{th}$ interfaces 265-1 to 265-N are connected to the aforementioned components via the bus 266. One of the interfaces may be a network interface that is connected to an external device through a network.

In particular, when the portable device 200 is in the first display mode, the controller 260 may display document data including a plurality of text blocks and at least one multimedia block. The first display mode of the portable device 200 is display mode of when the sensor 250 senses that the user's orientation of the portable device 200 is first direction (e.g. horizontal direction). In particular, the first display mode of the portable device 200 provides an image having the same horizontal and vertical lengths as a screen on which the document data are written. For example, when document data is written on a screen of 800*480, the screen of the first display mode may be 800*480.

In addition, when the sensor 250 senses that the user's orientation of the portable device 200 changes from the first direction to second direction, the controller 260 may change the display mode of the portable device 200 from the first display mode to the second display mode. The second display mode provides a screen having different horizontal and vertical lengths from the screen of the first display mode. For example, in the first display mode, the screen size may be 800*480, and in the second display mode, the screen size may be 480*800.

When the display mode of the portable device 200 changes from the first display mode to the second display mode, the controller 120 may determine the rearrangement order of the plurality of text blocks and the at least one multimedia block.

FIGS. 3, 4, 5, 6, 7, 8, and 9 illustrate a method for determining an order of rearranging document data when a display mode of a portable device changes according to an embodiment of the present disclosure.

Figure 3:
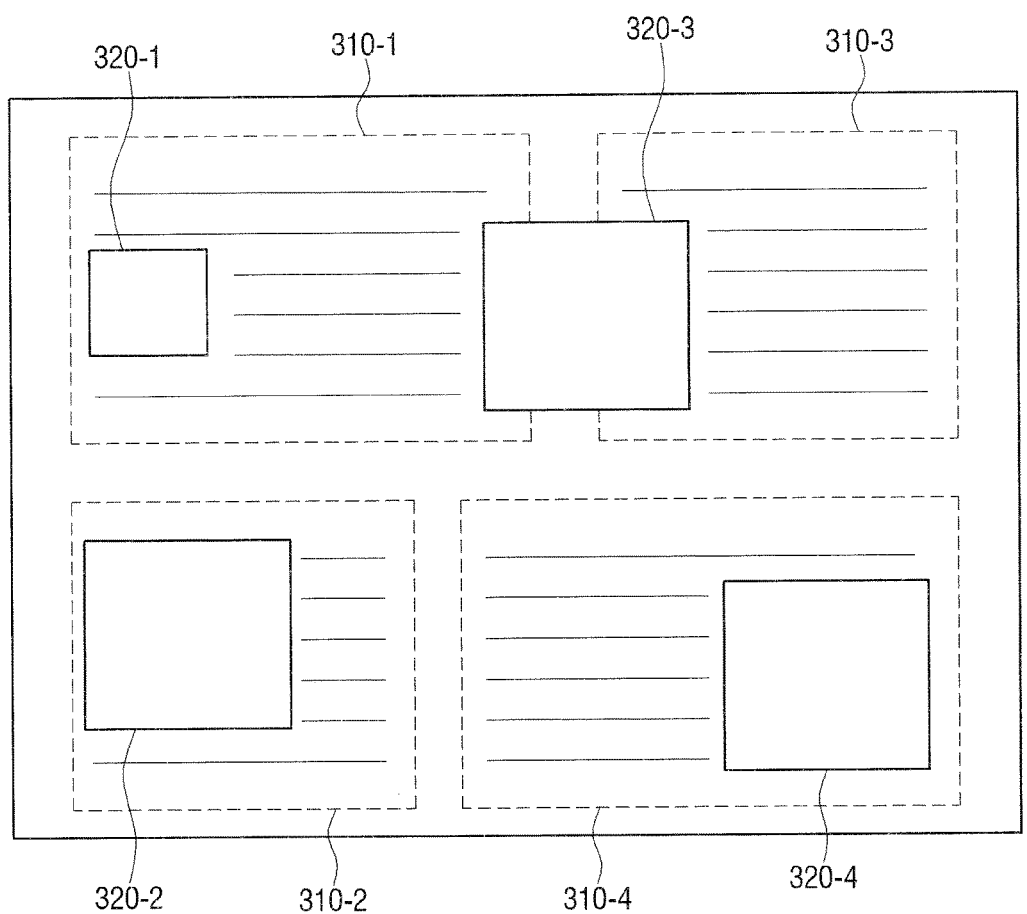
FIGS. 3, 4, 5, 6, 7, 8, and 9 illustrate a method for determining an order of rearranging document data when a display mode of a portable device changes according to an embodiment of the present disclosure.

Referring to FIGS. 3, 4, 5, 6, 7, 8, and 9, when the portable device 200 is in the horizontal mode, the portable device 200 may display document data including four text blocks 310-1, 310-2, 310-3, and 310-4 and four multimedia blocks 320-1, 320-2, 320-3, and 320-4 as shown in FIG. 3.

Figure 4:
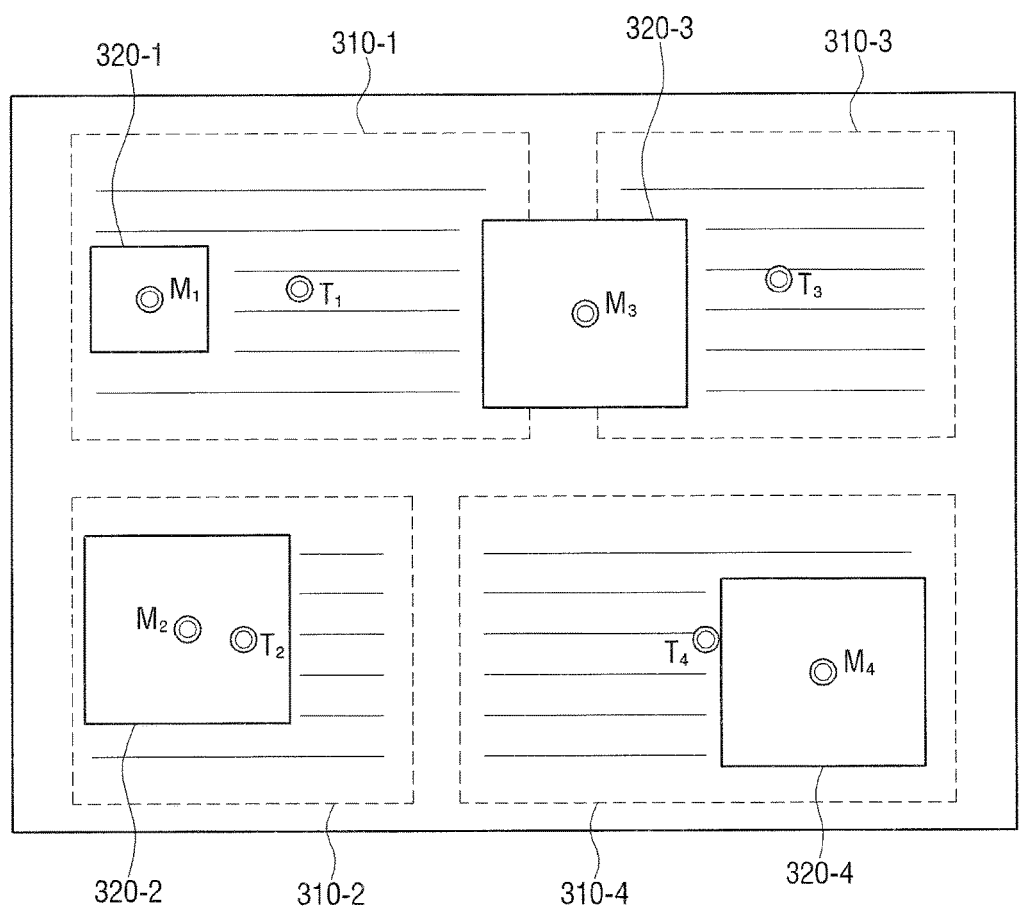

When it is determined that the portable device 200 changes from the horizontal mode to the vertical mode, the controller 260 may determine central points T1, T2, T3, T4, M1, M2, M3, and M4 of the four text blocks 310-1, 310-2, 310-3, and 310-4 and the four multimedia blocks 320-1, 320-2, 320-3, and 320-4 as shown in FIG. 4.

Figure 5:
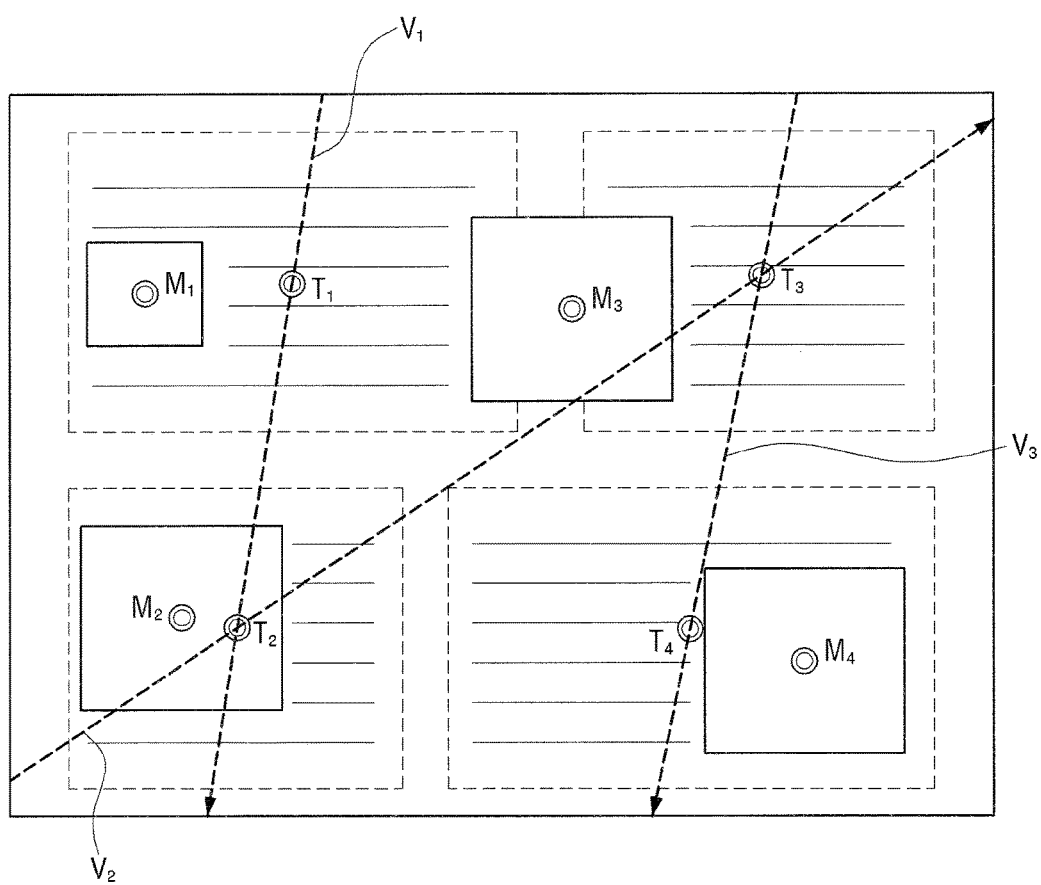

Subsequently, the controller 260 connects the central points of the four text blocks 310-1, 310-2, 310-3, and 310-4 and calculates three vectors V1, V2, and V3 as shown in FIG. 5. The order of the four text blocks 310-1, 310-2, 310-3, and 310-4 may be predetermined. That is, the order of the first text block 310-1, the second text block 310-2, the third text block 310-3, and the fourth text block 310-4 is predetermined as first, second, third, and fourth priorities respectively. In this embodiment of the present disclosure, the order of the text blocks may be predetermined, but this is merely an embodiment. It is also possible to determine the order of the text blocks by paragraph analysis or semantic analysis.

Figure 6:
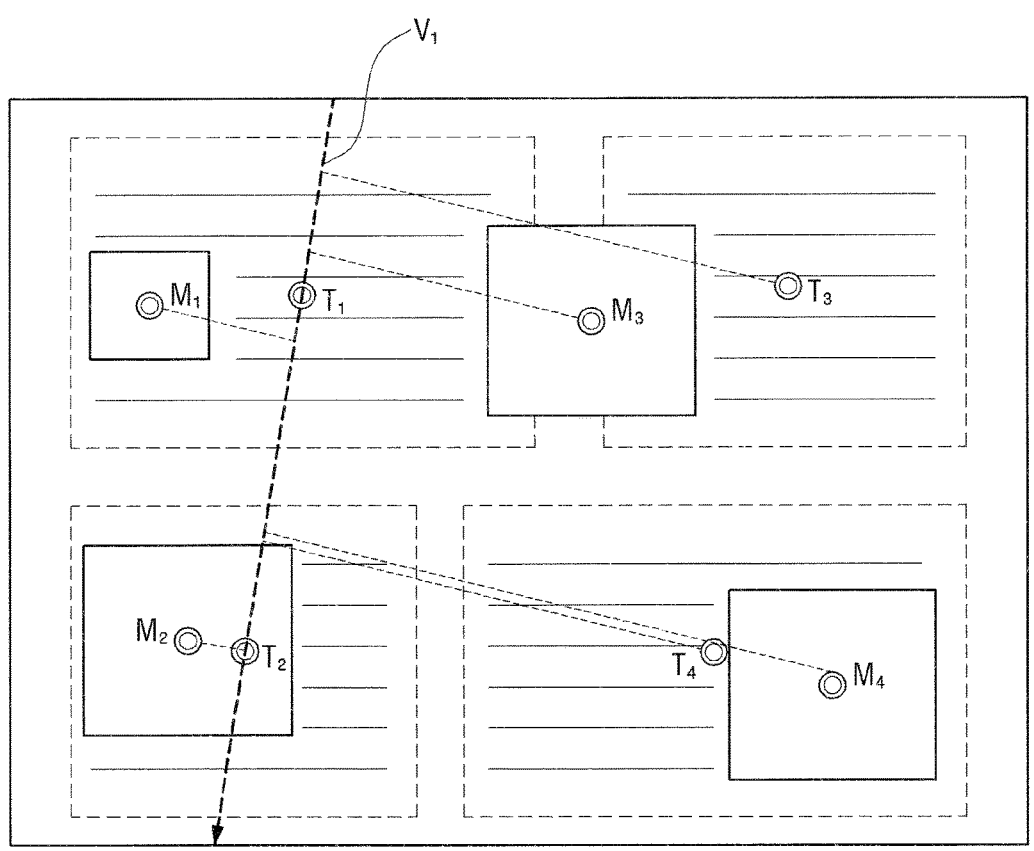

Subsequently, the controller 260 calculates the distances between the first vector V1 and the central points of each of the four text blocks 310-1, 310-2, 310-3, and 310-4 and the four multimedia blocks 320-1, 320-2, 320-3, and 320-4 as shown in FIG. 6. The calculation results are shown in Table 1 below.

TABLE 1

| Vector | Order | Central point | Distance |
|---|---|---|---|
| 1 | 1 | T3 | 10 |
| 1 | 2 | M3 | 8 |
| 1 | 3 | T1 | 0 |
| 1 | 4 | M1 | 5 |
| 1 | 5 | M4 | 15 |
| 1 | 6 | T4 | 10 |
| 1 | 7 | M2 | 3 |
| 1 | 8 | T2 | 0 |

Figure 7:
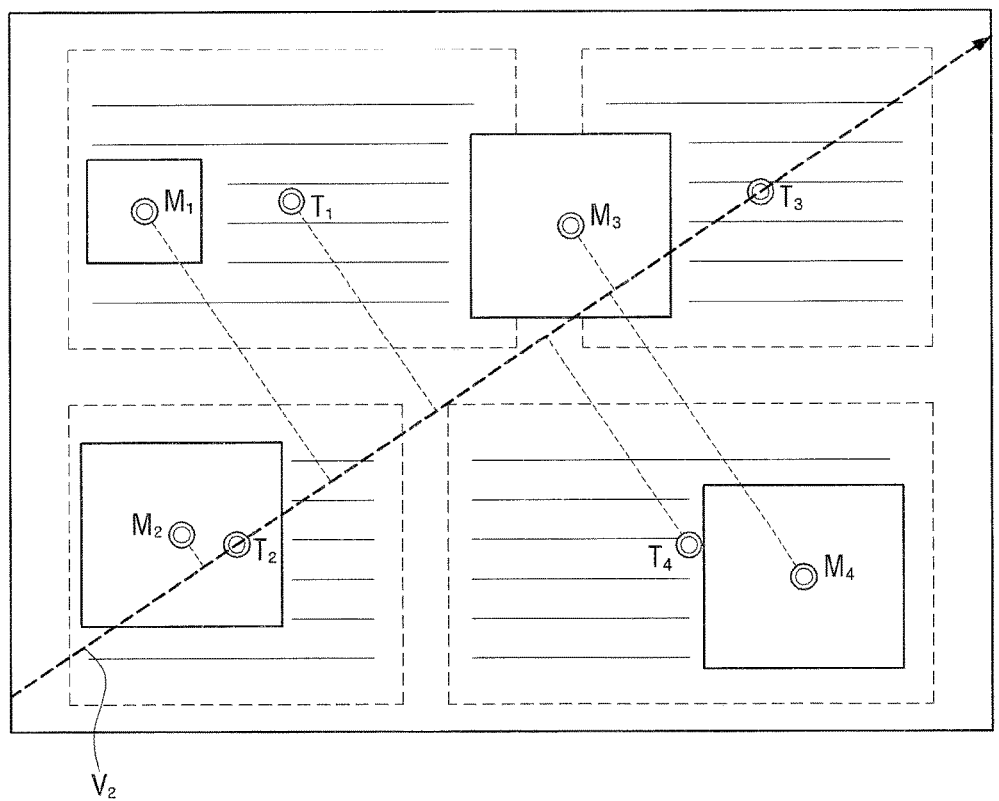

In addition, the controller 260 calculates the distances between the second vector V2 and the central points of the four text blocks 310-1, 310-2, 310-3, and 310-4 and the four multimedia blocks 320-1, 320-2, 320-3, and 320-4 as shown in FIG. 7. The calculation results are shown in Table 2 below.

TABLE 2

| Vector | Order | Central point | Distance |
|---|---|---|---|
| 2 | 1 | M2 | 2 |
| 2 | 2 | T2 | 0 |
| 2 | 3 | M1 | 8 |
| 2 | 4 | T1 | 7 |
| 2 | 5 | T4 | 7 |
| 2 | 6 | M3 | 3 |
| 2 | 7 | M4 | 10 |
| 2 | 8 | T3 | 0 |

Figure 8:
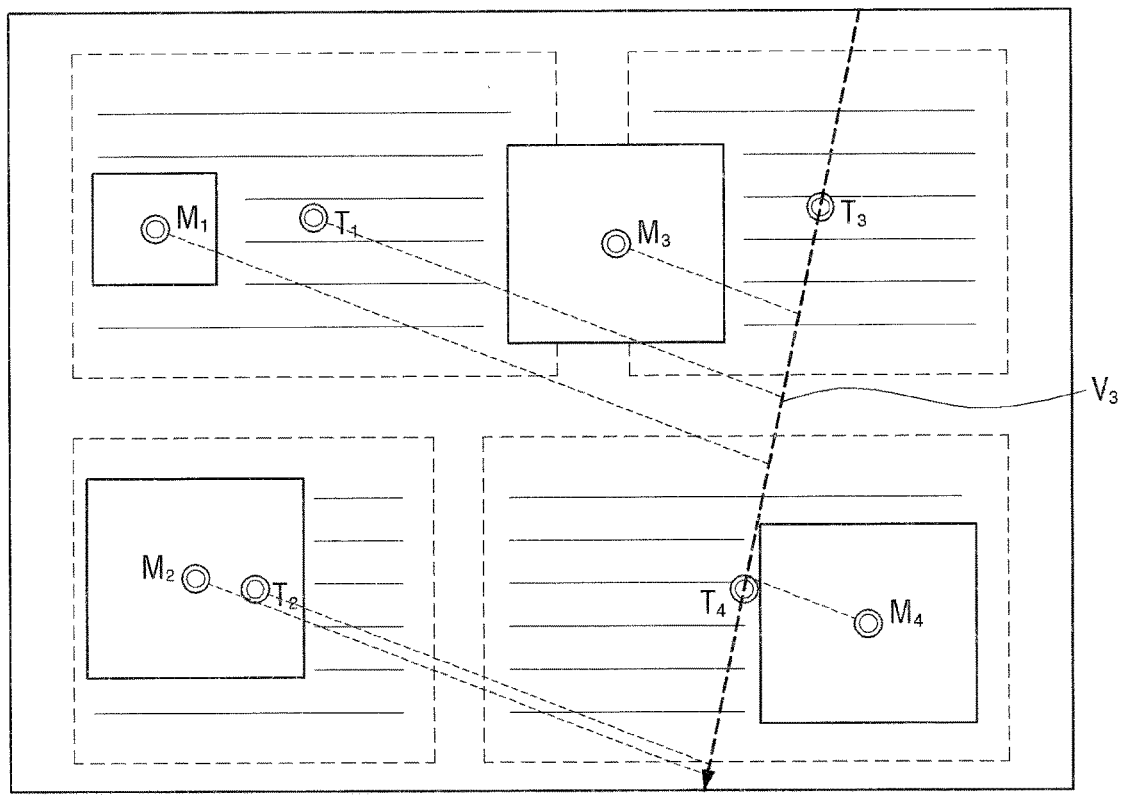

In addition, the controller 260 calculates the distances between the third vector V3 and the central points of the four text blocks 310-1, . . . , and 310-4 and the four multimedia blocks 320-1, 320-2, 320-3, and 320-4 as shown in FIG. 8. The calculation results are shown in Table 3 below.

TABLE 3

| Vector | Order | Central point | Distance |
|---|---|---|---|
| 3 | 1 | T3 | 0 |
| 3 | 2 | M3 | 6 |
| 3 | 3 | T1 | 12 |
| 3 | 4 | M1 | 15 |
| 3 | 5 | M4 | 5 |
| 3 | 6 | T4 | 0 |
| 3 | 7 | T2 | 11 |
| 3 | 8 | M2 | 13 |

Subsequently, the controller 260 arranges the calculated distances between the first to third vectors V1, V2, and V3 and the central points of the four text blocks 310-1, 310-2, 310-3, and 310-4 and the four multimedia blocks 320-1, 320-2, 320-3, and 320-4 as shown in Table 4 below.

TABLE 4

| Vector | Order | Central point | Distance |
|---|---|---|---|
| 1 | 1 | T3 | 10 |
| 1 | 2 | M3 | 8 |
| 1 | 3 | T1 | 0 |
| 1 | 4 | M1 | 5 |
| 1 | 5 | M4 | 15 |
| 1 | 6 | T4 | 10 |
| 1 | 7 | M2 | 3 |
| 1 | 8 | T2 | 0 |
| 2 | 9 | M2 | 2 |
| 2 | 10 | T2 | 0 |
| 2 | 11 | M1 | 8 |
| 2 | 12 | T1 | 7 |
| 2 | 13 | T4 | 7 |
| 2 | 14 | M3 | 3 |
| 2 | 15 | M4 | 10 |
| 2 | 16 | T3 | 0 |
| 3 | 17 | T3 | 0 |
| 3 | 18 | M3 | 6 |
| 3 | 19 | T1 | 12 |
| 3 | 20 | M1 | 15 |
| 3 | 21 | M4 | 5 |
| 3 | 22 | T4 | 0 |
| 3 | 23 | T2 | 11 |
| 3 | 24 | M2 | 13 |

Subsequently, for each order, the controller 260 may perform the following operations from the last order in a descending manner:
Search for an order having the same central point in descending order from a current order.
Delete the found order when the distance of the central point of the found order is higher than the distance of the central point of the current order.
Delete the current order and move to a previous order when the distance of the central point of the found order is equal to or lower than the distance of the central point of the current order.

For example, for $24^{th}$ order line, the controller 260 may compare the $24^{th}$ order line with $9^{th}$ order line, which has the same central point as the $24^{th}$ order line. Since the distance "2" of the $9^{th}$ order line is lower than the distance "13" of the $24^{th}$ order line, the controller 260 may delete the $24^{th}$ order line, which is the current order line. Subsequently, the controller 260 moves to $23^{th}$ order line. For the $23^{th}$ order line, the controller 260 may compare the $23^{th}$ order line with $10^{th}$ order line having the same central point as the $23^{th}$ order line. Since the distance "0" of the $10^{th}$ order line is lower than distance the "11" of the $23^{th}$ order line, the controller 260 may delete the $23^{th}$ order line, which is the current order line. Subsequently, the controller 260 moves to $22^{th}$ order line. For the $22^{th}$ order line, the controller 260 may compare the $22^{th}$ order line with $13^{th}$ order line having the same central point as the $22^{th}$ order line. Since the distance "7" of the $13^{th}$ order line is higher than the distance "0" of the $22^{th}$ order line, the controller 260 may delete the $13^{th}$ order line.

Using this method, the controller 260 arranges lines having the shortest distance for all of the central points are as shown in Table 5 below.

TABLE 5

| Vector | Order | Central point | Distance |
|---|---|---|---|
| 1 | 3 | T1 | 0 |
| 1 | 4 | M1 | 5 |
| 1 | 8 | T2 | 0 |
| 2 | 9 | M2 | 2 |
| 2 | 14 | M3 | 3 |
| 2 | 16 | T3 | 0 |
| 3 | 21 | M4 | 5 |
| 3 | 22 | T4 | 0 |

Subsequently, the controller 260 may determine the rearrangement order based on Table 5. That is, the controller 260 may determine the rearrangement order in the order of the first text block 310-1, the first multimedia block 320-1, the second text block 310-2, the second multimedia block 320-2, the third multimedia block 320-3, the third text block 310-3, the fourth multimedia block 320-4, and the fourth text block 310-4.

Subsequently, the controller 260 may display the plurality of text blocks and the at least one multimedia block in the rearrangement order of Table 5. For example, the controller 260 may display the blocks in the order of the first text block 310-1, the first multimedia block 320-1, the second text block 310-2, the second multimedia block 320-2, the third multimedia block 320-3, the third text block 310-3, the fourth multimedia block 320-4, and the fourth text block 310-4 as shown in FIG. 9.

Figure 9:
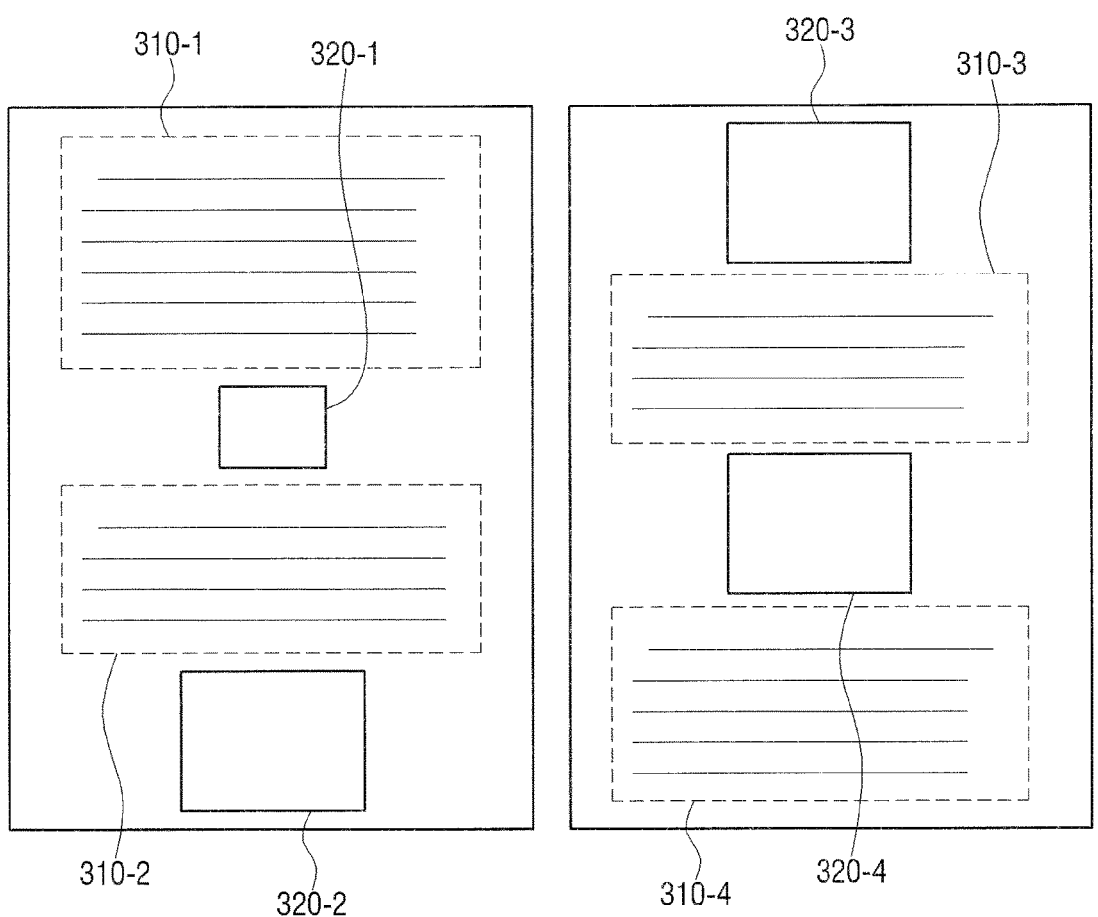

At this time, the controller 260 may control the display 220 to adjust horizontal lengths of the text blocks to correspond to a horizontal length of the screen so that the text blocks can fit into the screen as shown in FIG. 9.

Figure 10:
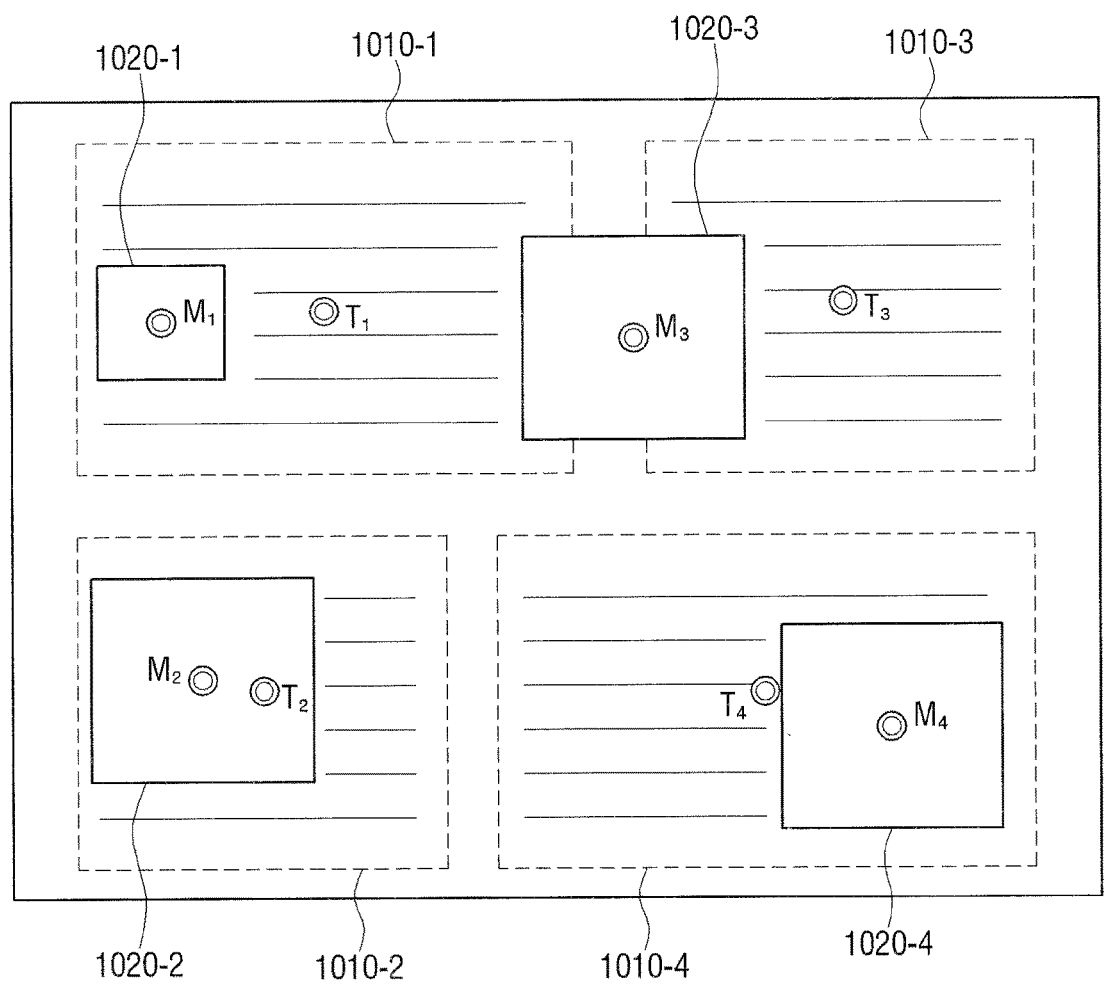
FIGS. 10 and 11 illustrate a method for determining an order of rearranging document data when a display mode of a portable device changes according to another embodiment of the present disclosure.
Figure 11:
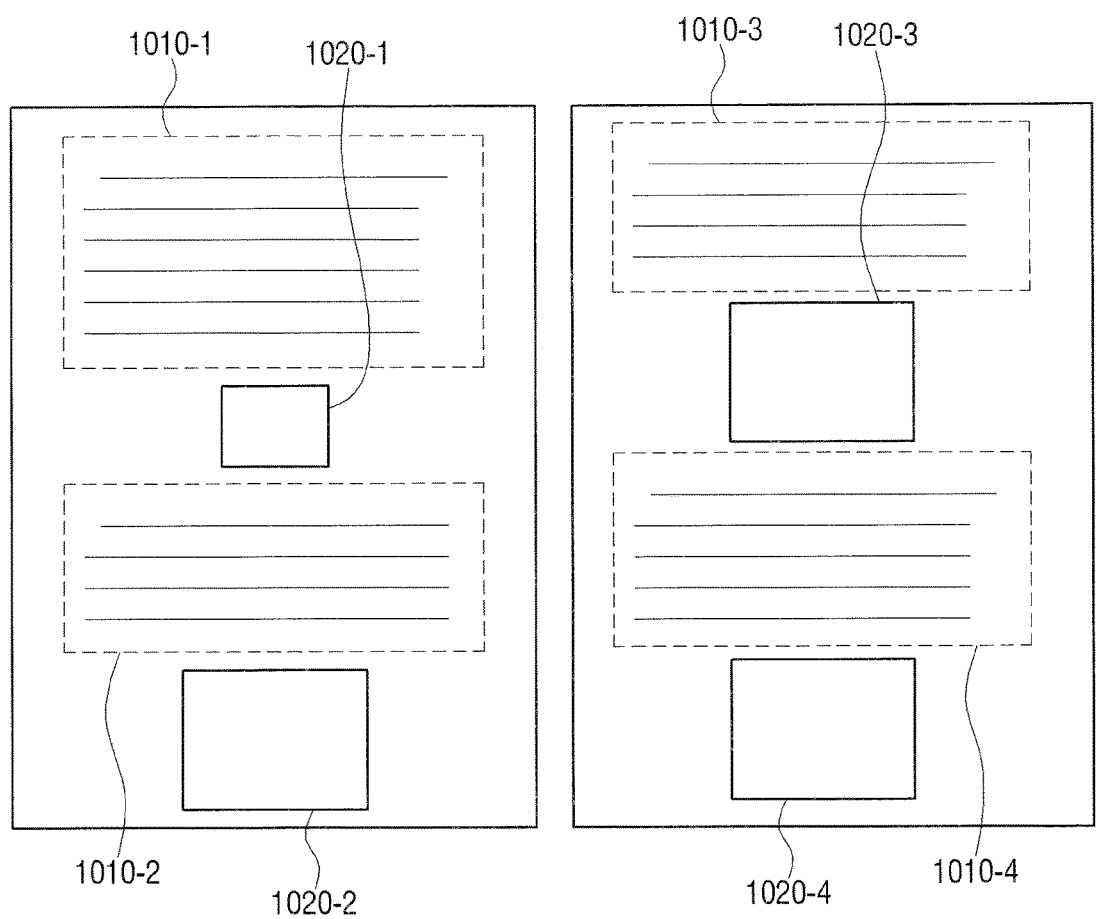

FIGS. 10 and 11 illustrate a method for determining an order of rearranging document data when a display mode of a portable device changes to another embodiment of the present disclosure Referring to FIGS. 10 and 11, when the portable device 200 is in the horizontal mode, the portable device 200 may also display document data including four text blocks 1010-

1, 1010-2, 1010-3, and 1010-4 and four multimedia blocks 1020-1, 1020-2, 1020-3, and 1020-4 as shown in FIG. 10.

When it is determined that the portable device 200 changes from the horizontal mode to the vertical mode, the controller 260 may determine the central points T1, T2, T3, T4, M1, M2, M3, and M4 of the four text blocks 1010-1, 1010-2, 1010-3, and 1010-4 and the four multimedia blocks 1020-1, 1020-2, 1020-3, and 1020-4 as shown in FIG. 10.

Subsequently, for the four multimedia blocks 1020-1, 1020-2, 1020-3, and 1020-4, the controller 260 calculates the distances between the central point of each multimedia block and the central blocks of the plurality of text blocks 1010-1, 1010-2, 1010-3, and 1010-4. The calculated distances may be shown as in Table 6 below.

TABLE 6

| Central point of multimedia block | Central point of text block | Distance |
| --- | --- | --- |
| M1 | T1 | 6 |
|    | T2 | 9 |
|    | T3 | 12 |
|    | T4 | 20 |
| M2 | T1 | 9 |
|    | T2 | 2 |
|    | T3 | 15 |
|    | T4 | 18 |
| M3 | T1 | 10 |
|    | T2 | 13 |
|    | T3 | 5 |
|    | T4 | 11 |
| M4 | T1 | 18 |
|    | T2 | 17 |
|    | T3 | 9 |
|    | T4 | 3 |

Based on Table 6, the controller 260 may determine text blocks having the shortest distance from each of the multimedia blocks. For example, the controller 260 may determine that the first multimedia block 1020-1 is closest to the first text block 1010-1, the second multimedia block 1020-2 is closest to the second text block 1010-2, the third multimedia block 1020-3 is closest to the third text block 1010-3, and the fourth multimedia block 1020-4 is closest to the fourth text block 1010-4.

Subsequently, the controller 260 may arrange the plurality of text blocks 1010-1, 1010-2, 1010-3, and 1010-4 first, and then arrange a multimedia block that is closest to a particular text block. For example, the controller 260 may arrange the first to fourth text blocks 1010-1, 1010-2, 1010-3, and 1010-4 first, and then arrange the first multimedia block 1020-1 which is closest to the first text block 1010-1, after the first text block 1010-1, arrange the second multimedia block 1020-2 which is closest to the second text block 1010-2, after the second text block 1010-2, arrange the third multimedia block 1020-3 which is closest to the third text block 1010-3, after the third text block 1010-3, and arrange the fourth multimedia block 1020-4 which is closest to the fourth text block 1010-4, after the fourth text block 1010-4. Accordingly, the controller 260 may determine the rearrangement order in the order of the first text block 1010-1, the first multimedia block 1020-1, the second text block 1010-2, the second multimedia block 1020-2, the third text block 1010-3, the third multimedia block 1020-3, the fourth text block 1010-4, and the fourth multimedia block 1020-4.

Subsequently, the controller 260 may display the plurality of text blocks and the at least one multimedia block in the rearrangement order. For example, the controller 260 may display the blocks in the order of the first text block 1010-1, the first multimedia block 1020-1, the second text block 1010-2, the second multimedia block 1020-2, the third text block 1010-3, the third multimedia block 1020-3, the fourth text block 1010-4, and the fourth multimedia block 1020-4 as shown in FIG. 11.

In addition, the controller 260 may control the display 220 to adjust horizontal lengths of the text blocks to correspond to a horizontal length of the screen such that the text blocks fit into the screen as shown in FIG. 11.

Although methods for determining the rearrangement order have been described with reference to the first embodiment (FIGS. 3 to 9) and the second embodiment (FIGS. 10 and 11), they are merely various embodiments. It is also possible to determine the rearrangement order using other methods. For example, the rearrangement order may be determined by determining that a multimedia block having its central point in a text block is the most adjacent to the text block.

Using the portable device 200 as described above, the user can favorably view document data in any display mode.

Figure 12:
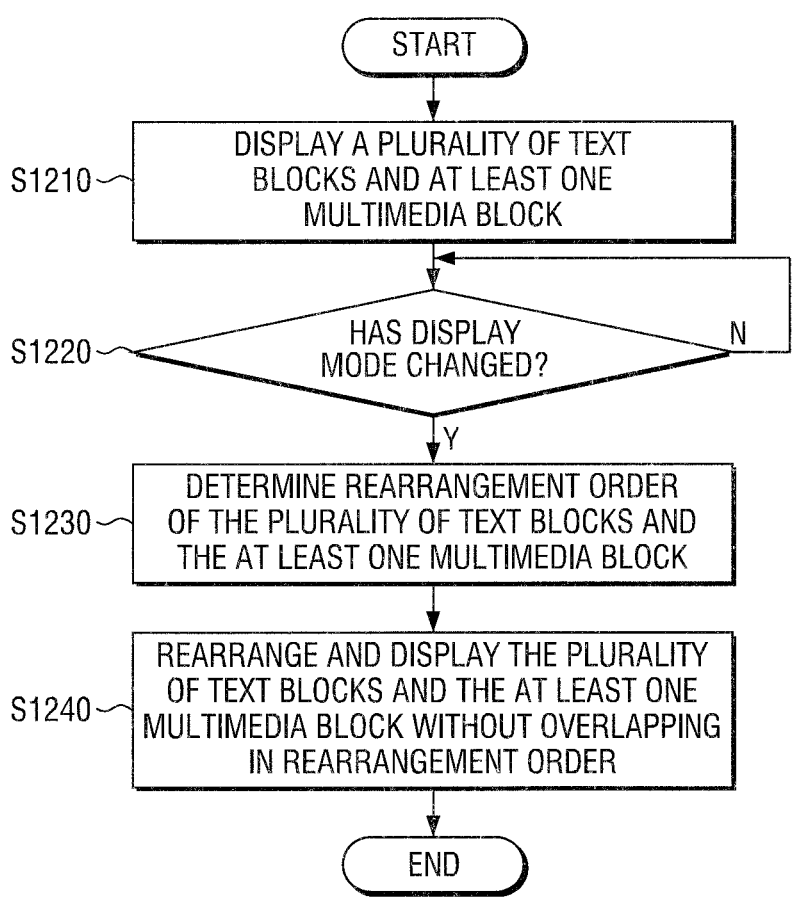
FIG. 12 is a flowchart illustrating a method of document data according to an embodiment of the present disclosure.

FIG. 12 is a flow chart illustrating a method of displaying document data according to an embodiment of the present disclosure.

Referring to FIG. 12, in operation S1210, the portable device 200 displays a plurality of text blocks and at least one multimedia block. More specifically, when the portable device 200 is in first display mode, the portable device 200 may display document data including the plurality of text blocks and the at least one multimedia block. The first display mode of the portable device 200 provides an image on a screen which has the same horizontal and vertical lengths as a screen on which the document data is displayed.

In operation S1220, the portable device 200 determines whether the display mode changes. For example, the portable device 200 may determine whether the display mode changes from the first display mode (e.g., a horizontal mode) to second display mode (e.g., a vertical mode).

When the display mode of the portable device 200 changes in operation S1220, the portable device 200 determines rearrangement order of the plurality of text blocks and the at least one multimedia block in operation S1230. More specifically, the portable device 200 may determine the rearrangement order using the methods described above with reference to FIGS. 3, 4, 5, 6, 7, 8, 9, 10, and 11.

In operation S1240, the portable device 200 rearranges and displays the plurality of text blocks and the at least one multimedia block in the rearrangement order. More specifically, the portable device 200 may display the plurality of text blocks and the at least one multimedia block as shown in FIG. 9 or FIG. 11, for example.

Although the display mode changes, the portable device 200 rearranges and displays the plurality of text blocks and the at least one multimedia block. Accordingly, the user can favorably see document data in any display mode.

In the above various embodiments, when the display mode of the electronic device changes from the first display mode to the second display mode, display of document data is modified. However, embodiments are merely examples of various embodiments. The disclosure may also be applied even when document data are displayed on a screen which is different in size from a screen on which the document data are written. For example, when document data are written on a screen of 1280*800 and the size of a screen to display the document data is 800*480, the electronic device 200 may change the document data in the methods described above.

Furthermore, even when the size of the screen is changed by the user's manipulation, the present disclosure may be applied.

The image displaying method of the electronic device according to the various embodiments may be implemented with a program and be provided to display devices.

A program may include first display operation of displaying at least one multimedia block, determining rearrangement order of a plurality of text blocks and the at least one multimedia block when display mode of the portable device changes from the first display mode to the second display mode, and second display operation of rearranging and displaying the a plurality of text blocks and the at least one multimedia block in the determined rearrangement order may be stored in a non-transitory computer readable medium and be provided.

The non-transitory computer readable medium is a medium stores data semi-permanently and is readable by suitable devices. More specifically, the aforementioned applications or programs may be stored in a suitable non-transitory computer readable medium such as a Compact Disk (CD), Digital Video Disk (DVD), Hard Disk, Blu-ray Disk, Universal Serial Bus (USB) storage medium, Memory Card, and Read-Only Memory (ROM).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying images in a portable device including a sensor to sense orientation of the portable device, the method comprising:
    if the portable device is oriented in a first direction, displaying a plurality of text blocks and at least one multimedia block; and
    in response to sensing, by the sensor, that the orientation of the portable device changes from the first direction to a second direction, determining a display order of the plurality of text blocks and the at least one multimedia block and rearranging the plurality of text blocks and the at least one multimedia block based on the determined display order,
    wherein the determining of the display order comprises:
        identifying an order of the plurality of text blocks displayed in a state which the portable device is oriented in the first direction,
        calculating at least one vector by connecting central points of the plurality of text blocks based on the order of the plurality of text blocks, and
        determining the display order based on a first distance between the at least one vector and the central points of the plurality of text blocks and a second distance between the at least one vector and central points of the at least one multimedia block, the first and second distances each being a shortest distance from the at least one vector.

2. The method of claim 1, wherein the order of the plurality of text blocks is predetermined.

3. The method of claim 1, wherein the arranging of the plurality of text blocks and the at least one multimedia block further comprises arranging a first multimedia block of the at least one multimedia block after a first text block closest to the first multimedia block.

4. The method of claim 1, wherein the first direction is one of horizontal mode and vertical mode and the second direction is a mode which is different from the first direction.

5. The method of claim 1, wherein the at least one multimedia block comprises at least one of an image block, a video block, a widget block, or a slide block.

6. A portable device for displaying images, the portable device comprising:
    a display configured to display an image;
    a sensor configured to sense orientation of the portable device; and
    at least one processor configured to:
        if the portable device is oriented in a first direction, control the display to display a plurality of text blocks and at least one multimedia block, and
        in response to the sensor sensing that the orientation of the portable device changes from the first direction to a second direction, determine a display order of the plurality of text blocks and the at least one multimedia block and rearrange the plurality of text blocks and the at least one multimedia block based on the determined display order,
    wherein the at least one processor further configured to:
        identify an order of the plurality of text blocks displayed in a state which the portable device is oriented in the first direction,
        calculate at least one vector by connecting central points of the plurality of text blocks based on the order of the plurality of text blocks, and
        determine the display order based on a first distance between the at least one vector and the central points of the plurality of text blocks and a second distance between the at least one vector and central points of the at least one multimedia block, the first and second distances each being a shortest distance from the at least one vector.

7. The portable device of claim 6, wherein the order of the plurality of text blocks is predetermined.

8. The portable device as claimed in claim 6, wherein the at least one processor is further configured to control the display to arrange the at least one multimedia block after a first text block closest to the at least one multimedia block.

9. The portable device of claim 6, wherein the first direction is one of a horizontal mode and a vertical mode and the second direction is different from the first direction.

10. The portable device of claim 6, wherein the at least one multimedia block comprises at least one of an image block, a video block, a widget block, or a slide block.

11. At least one non-transitory processor readable medium for storing a computer program of instructions configured to be readable by at least one processor for instructing the at least one processor to execute a computer process for performing the method as recited in claim 1.

* * * * *